United States Patent
Nazarpoor (10) Patent No.: US 9,498,767 B2
(45) Date of Patent: *Nov. 22, 2016

(54) SYSTEMS AND METHODS FOR PROVIDING ZPGM PEROVSKITE CATALYST FOR DIESEL OXIDATION APPLICATIONS

(71) Applicant: Clean Diesel Technologies, Inc., Oxnard, CA (US)

(72) Inventor: Zahra Nazarpoor, Camarillo, CA (US)

(73) Assignee: Clean Diesel Technologies, Inc. (CDTI), Oxnard, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 13/904,271

(22) Filed: May 29, 2013

(65) Prior Publication Data

US 2014/0356243 A1 Dec. 4, 2014

(51) Int. Cl.
*B01J 23/68* (2006.01)
*B01J 23/00* (2006.01)
*B01D 53/94* (2006.01)

(52) U.S. Cl.
CPC ........... *B01J 23/688* (2013.01); *B01D 53/944* (2013.01); *B01J 23/002* (2013.01); *B01D 2255/104* (2013.01); *B01D 2255/2061* (2013.01); *B01D 2255/2073* (2013.01); *B01D 2255/402* (2013.01); *B01D 2255/65* (2013.01); *B01D 2258/012* (2013.01); *B01J 2523/00* (2013.01)

(58) Field of Classification Search
None
See application file for complete search history.

(56) References Cited

U.S. PATENT DOCUMENTS

2009/0324468 A1* 12/2009 Golden et al. ............... 423/210

FOREIGN PATENT DOCUMENTS

EP  0808800 A2 * 5/1997
EP  2441510 A1 * 4/2012

* cited by examiner

*Primary Examiner* — Walter D Griffin
*Assistant Examiner* — Jelitza Perez
(74) *Attorney, Agent, or Firm* — Alston & Bird LLP (57) ABSTRACT

Diesel oxidation ZPGM catalyst systems using $Y_{1-x}Ag_xMnO_3$ perovskite are disclosed. The ZPGM catalyst system compositions may include $Y_{1-x}Ag_xMnO_3$ perovskite in impregnation component and at least one carrier material oxide in washcoat. The ZPGM catalyst system compositions may also include $Y_{1-x}Ag_xMnO_3$ perovskite co-precipitated in a carrier material oxide as washcoat. The catalyst activity is measured with an inlet gas mixture containing diesel exhaust composition and characterized according to performance in NO oxidation, $NO_2$ production, NO storage capability and diesel oxidation applications.

14 Claims, 8 Drawing Sheets

SYSTEMS AND METHODS FOR PROVIDING ZPGM PEROVSKITE CATALYST FOR DIESEL OXIDATION APPLICATIONS

CROSS-REFERENCE TO RELATED APPLICATIONS

N/A

BACKGROUND

1. Technical Field

This disclosure relates generally to catalyst systems, and, more particularly, to diesel oxidation catalyst (DOC) systems substantially free of Platinum Group Metals (PGM).

2. Background Information

Regulatory standards for acceptable emissions may be continuously revised in response to human health issues and air-quality concerns. Strict-compliance regulatory standards may be adopted worldwide to control emissions of oxides of nitrogen ($NO_x$), particulate matter (PM), carbon monoxide (CO), and carbon dioxide ($CO_2$) from various sources, such as automobiles, utility plants, and processing and manufacturing plants amongst others, prior to exhaust gas discharge to the atmosphere. Exhaust gases of CO, HC, and $NO_x$ may be one of the main objectives for catalytic control of air pollution.

Diesel oxidation catalyst systems may be manufactured using platinum group metals (PGM) which are characterized by a small market circulation volume, constant fluctuations in price, and constant risk to stable supply, variables that drive up their cost. These facts may be conducive to the realization of a PGM-free diesel oxidation catalyst system.

A need may exist for diesel oxidation catalyst systems which may not require PGMs and may have similar or improved performance as currently known diesel oxidation catalyst systems. Said catalyst systems may face the need of upgrading their resistance to catalytic poisons because the surface of metallic nano-particles in the catalytic centers may show affinity to other chemical species that when adsorbed may block the adsorption of the target species of the catalyst, causing a serious suppression of the desired reactions. This suppression of reactions may take place even with overheating of the catalyst materials at regular intervals to promote thermal desorption of catalytic poisons from the catalytic center surface and to reactivate the catalytic function. The problems faced by PGM catalyst systems may be addressed by alternative materials which may be used as active catalyst phases. Among these materials, perovskite oxides may be alternatives for exhaust gas depollution.

For the foregoing reasons, it may be desirable to have a cost effective diesel oxidation catalyst system, which may control exhaust emissions with similar or enhanced catalytic performance than existing diesel oxidation catalysts.

SUMMARY

The present disclosure may provide ZPGM DOC systems in which a different approaches may facilitate CO, HC, and $NO_x$ reduction in the exhaust stream of different diesel environments. Compositions of ZPGM DOC systems may include any suitable combination of a substrate, a washcoat and an impregnation layer which may be substantially free of platinum group metals with a perovskite structure. The method of synthesis may include one-step processing of depositing perovskite catalyst material on a washcoat by any deposition methods known in the art such as co-precipitation. The method of synthesis may include a two-step processing in which the washcoating process may be followed by an impregnation step, in which the washcoat is free of catalyst material and the impregnation component includes ZPGM perovskite catalyst.

ZPGM DOC catalyst systems may be formed by using a perovskites structure with the general formulation of $ABO_3$. Cations combinations may be formed with partial substitution of A and B phase with a general formula of $A_{1-x}a_xB_{1-y}b_yO_3$. Materials that may be suitable to form perovskites may include but not limited to silver (Ag), manganese (Mn), yttrium (Y), lanthanum (La), cerium (Ce), iron (Fe), praseodymium (Pr), neodymium (Nd), strontium (Sr), cadmium (Cd), cobalt (Co), scandium (Sc), copper (Cu), niobium (Nb), and tungsten (W).

Suitable carrier material oxides that may be used in washcoat may include $ZrO_2$, doped $ZrO_2$ with Lanthanide group metals, $Nb_2O_5$, $Nb_2O_5$—$ZrO_2$, alumina, doped alumina, $TiO_2$, doped $TiO_2$ or mixtures thereof.

In the present disclosure a perovskite structure of an yttrium, silver, and manganese perovskite, $Y_{1-x}Ag_xMnO_3$, may be formed and employed in the preparation of coated samples prepared by impregnating Y—Ag—Mn perovskite on a washcoat of praseodymium doped zirconia as carrier metal oxide. Coated samples may also be prepared by co-precipitation synthesis of a washcoat of Y—Ag—Mn perovskite supported on praseodymium doped zirconia.

Applications that may be presented for ZPGM DOC catalyst systems of present disclosure may include oxidation of NO to $NO_2$, low temperature NOX storage, and diesel oxidation.

Numerous objects and advantages of the present disclosure may be apparent from the detailed description that follows and the drawings which illustrate the embodiments of the present disclosure, and which are incorporated herein by reference.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms have the following definitions:

"Perovskite" may refer to a ZPGM catalyst, having ABO structure of material which may be formed by partially substituting element "A" and "B" base metals with suitable non-platinum group metals.

"Exhaust" may refer to the discharge of gases, vapor, and fumes including hydrocarbons, nitrogen oxide, and/or carbon monoxide.

"Washcoat" may refer to at least one coating including at least one oxide solid that may be deposited on a substrate.

"Impregnation" may refer to the process of imbuing or saturating a solid layer with a liquid compound or the diffusion of some element through a medium or substance.

"Co-precipitation" may refer to the carrying down by a precipitate of substances normally soluble under the conditions employed.

"Carrier material oxide (CMO)" may refer to support materials used for providing a surface for at least one catalyst.

"Oxygen storage material (OSM)" may refer to a material able to take up oxygen from oxygen rich streams and able to release oxygen to oxygen deficient streams.

"Conversion" may refer to the chemical alteration of at least one material into one or more other materials.

"Diesel oxidation catalyst" may refer to a device which utilizes a chemical process in order to break down pollutants from a diesel engine in the exhaust stream, turning them into less harmful components.

DESCRIPTION OF THE DRAWINGS

Various example embodiments of the present disclosure are described more fully with reference to the accompanying drawings in which some example embodiments of the present disclosure are shown. Illustrative embodiments of the present disclosure are disclosed herein. However, specific structural and functional details disclosed herein are merely representative for purposes of describing example embodiments of the present disclosure. This disclosure however, may be embodied in many alternate forms and should not be construed as limited to only the embodiments set forth herein.

System Configurations and Compositions

Figures 1A, 1B:
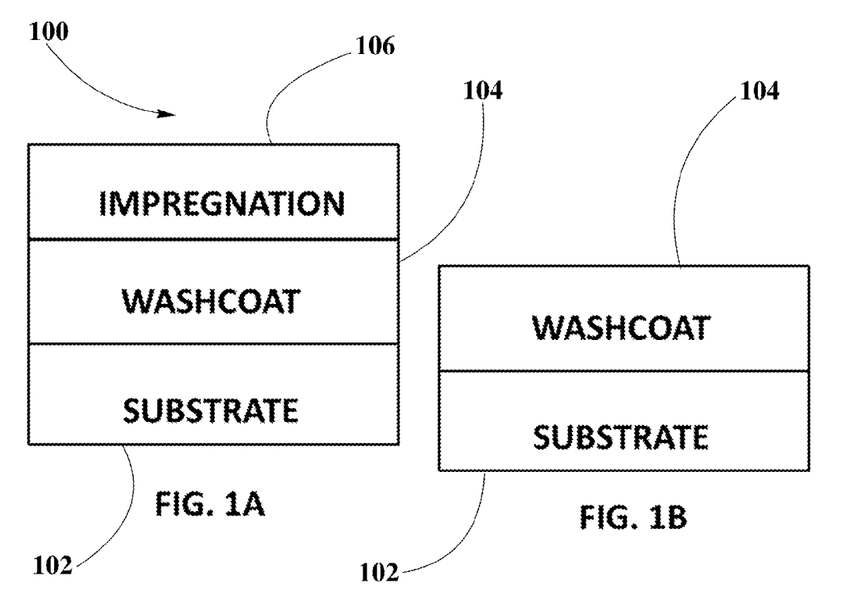
FIG. 1 shows a ZPGM DOC system configurations, according to an embodiment.

FIG. 1 depicts ZPGM DOC catalyst system 100 configurations, according to various embodiments. As shown in FIG. 1A, ZPGM DOC catalyst system 100 may include substrate 102, washcoat 104, and impregnation layer 106, where washcoat 104 or impregnation layer 106, or both, may contain active oxidation ZPGM catalyst components. FIG. 1B shows an embodiment of ZPGM DOC catalyst system 100 that includes a substrate 102 and a washcoat 104, where washcoat 104 includes active oxidation ZPGM catalyst components.

According to an embodiment, ZPGM DOC catalyst system 100 may include a perovskites structure with the general formulation of $ABO_3$. Cations combinations may be formed with partial substitution of A and B phase with a general formula of $A_{1-x}a_xB_{1-y}b_yO_3$. Materials that may be suitable to form perovskites may include but not limited to silver (Ag), manganese (Mn), yttrium (Y), lanthanum (La), cerium (Ce), iron (Fe), praseodymium (Pr), neodymium (Nd), strontium (Sr), cadmium (Cd), cobalt (Co), scandium (Sc), copper (Cu), niobium (Nb), tungsten (W) and mixtures thereof; and "x" and "y" may take values between 0 and 1. The perovskite or related structure may be present in about 1% to about 30% by weight.

ZPGM DOC catalyst systems 100 may include carrier material oxides (CMO) in washcoat 104. Suitable carrier material oxides which may be used in washcoat 104 may include $ZrO_2$, doped $ZrO_2$ with Lanthanide group metals, $Nb_2O_5$, $Nb_2O_5$—$ZrO_2$, alumina, doped alumina, $TiO_2$, doped $TiO_2$ or mixtures thereof.

Preparation of ZPGM DOC Catalyst Systems by Impregnation

In one embodiment, ZPGM DOC catalyst systems 100 may be prepared in a two-step process. In the first part of the process the components of washcoat 104 may be milled to form smaller particle sizes. The mixture may include water, a suitable binder material and a carrier material oxide or OSM, or both to produce an aqueous slurry. Suitable CMOs including $ZrO_2$, doped $ZrO_2$ with Lanthanide group metals, $Nb_2O_5$, $Nb_2O_5$—$ZrO_2$, alumina and doped alumina, or mixtures thereof. In one embodiment, praseodymium doped zirconia, $ZrO_2$—$Pr_6O_{11}$, may be used as carrier material oxide. Milling of components may take from about 10 minutes to about 10 hours, depending on the batch size, kind of material and particle size desired. Suitable average particle sizes in the slurry may be of about 4 μm to about 10 μm for the uniform distribution of washcoat 104 particles. Finer particles may have more coatability and better adhesion to substrate 102, as well as enhanced cohesion between washcoat 104 and impregnation layers 106.

The aqueous slurry may be coated onto a suitable substrate 102 and placed in any suitable manner such as dipping of substrate 102 into the slurry or spraying of the slurry onto substrate 102. Washcoated substrate 102 may be dried at room temperature and then fired at a temperature ranging from 400° C. to 700° C., for approximately 2 hours to 6 hours. In an embodiment, 550° C. for 4 hours.

The second step may be the preparation of impregnation layer 106. Initially, any suitable solutions of yttrium nitrate and manganese nitrate may be mixed at room temperature for about 1 hour to 5 hours. Subsequently, the third ZPGM metal solution such as silver nitrate solution may be added to the Y—Mn solution and mixed at room temperature for about 1 hour to 5 hours. When final mixture may be ready, it may be impregnated onto a previously washcoated substrate 102. Impregnated substrate 102 may be subsequently dried and fired. Firing may last between 3 hours and 6 hours, and may be performed at a temperature between 600° C. and 800° C. According to some embodiments, 4 hours for about 750° C. to form $Y_{1-x}Ag_xMnO_3$ perovskite supported on $ZrO_2$—$Pr_6O_{11}$.

Washcoats 104 and impregnation layers 106 may be coupled with substrates 102 in amounts that may cover most of, or all of the surface area of substrate 102. In an embodiment, about 60 g/L to about 250 g/L of washcoat 104 may be coupled with a substrate 102.

Other components such as acid or base solutions or various salts or organic compounds may be added to the aqueous slurry to adjust the rheology of the slurry and enhance binding of washcoat 104 and impregnation layer 106 to the substrate 102.

Preparation of ZPGM DOC Catalyst Systems by Co-Precipitation

In another embodiment, ZPGM DOC catalyst systems 100 may be prepared in a one-step process by co-precipitation.

Preparation of ZPGM DOC catalyst systems 100 may start with mixing of suitable yttrium and manganese nitrate solutions for 1 hour to 5 hours. Subsequently, a third ZPGM metal solution such as silver nitrate solution may be added to the Y—Mn solution and mixed at room temperature for about 1 hour to 5 hours. When the mixture of Y—Ag—Mn may be ready, it may be mixed during one hour with a carrier material oxide slurry that may be formed from mixing water with a metal oxide support. Water and metal oxide support may be mixed for one hour to 5 hours to form metal oxide slurry. Suitable CMOs including $ZrO_2$, doped $ZrO_2$ with Lanthanide group metals, $Nb_2O_5$, $Nb_2O_5$—$ZrO_2$, alumina and doped alumina, or mixtures thereof. In one embodiment, $ZrO_2$—$Pr_6O_{11}$, praseodymium doped zirconia, may be used as metal oxide support.

Subsequently, Y—Ag—Mn nitrate solutions and metal oxide slurry may be precipitated with any suitable compounds such as $NH_4OH$, $(NH_4)_2CO_3$, tetraethylammonium hydroxide, other tetraalkylammonium salts, ammonium acetate, or ammonium citrate, amongst others. The precipitated samples may be aged at room temperature for about 12 to 24 hours. Subsequently, the precipitated washcoat 104 may be deposited on substrate 102 followed by treating for about 3 hours to about 6 hours, at temperatures between 600° C. to 800° C. According to some embodiments, 4 hours for about 750° C. to form $Y_{1-x}Ag_xMnO_3$ perovskite supported on $ZrO_2$—$Pr_6O_{11}$.

EXAMPLES

Example #1

ZPGM DOC Catalyst Systems Prepared by Impregnation of Y—Ag—Mn Perovskite

In Example #1, ZPGM DOC catalyst system 100 may be prepared including a perovskite structure $Y_{0.8}Ag_{0.2}MnO_3$ according to the configuration described in FIG. 1A. Washcoat 104 may include at least a carrier material oxide of praseodymium doped zirconia, $ZrO_2$—$Pr_6O_{11}$. Washcoat 104 may include a binder or small amount rheology adjustment additives. Rheology adjustment additives may include acids, among other suitable substances and is free of oxygen storage material.

The loading of washcoat 104 may be about 80 g/L to about 180 g/L, and 120 g/L in one embodiment. The yttrium in impregnation layer 106 may be present in about 1% to about 10%, by weight. The silver in impregnation layer 106 may be present in about 1% to about 10%, by weight. The manganese in impregnation layer 106 may be present in about 1% to about 10%, by weight. To prepare ZPGM DOC catalyst system 100 of Example #1, carrier material oxide praseodymium doped zirconia is milled with water. The milled slurry may be deposited on substrate 102 in the form of washcoat 104 and then heat treated. This treatment may be performed at about 400° C. to about 700° C. In some embodiments this treatment may be performed at about 550° C. The heat treatment may last from about 2 to about 6 hours. In an embodiment the treatment may last about 4 hours. Then the $Y_{0.8}Ag_{0.2}MnO_3$ perovskite may be impregnated, dried and heat treated. This treatment may be performed at about 400° C. to about 800° C. In some embodiments this treatment may be performed at about 750° C. The heat treatment may last from about 2 to about 6 hours. In an embodiment the treatment may last about 4 hour.

Example #2

ZPGM DOC Catalyst Systems by Co-Precipitation of Y—Ag—Mn Perovskite

In Example #2, ZPGM DOC catalyst system 100 may be prepared including a perovskite structure $Y_{0.8}Ag_{0.2}MnO_3$ according to the configuration described in FIG. 1B. Washcoat 104 may be formed by co-precipitation of yttrium, silver, and manganese nitrate solutions on at least a carrier material oxide of praseodymium doped zirconia, $ZrO_2$—$Pr_6O_{11}$. Washcoat 104 is free of oxygen storage material. Precipitated washcoat 104 may be deposited on substrate 102 followed by treating for about 4 hours at a temperature of 750° C. The loading of washcoat 104 may be about 80 g/L to about 180 g/L, and 120 g/L in one embodiment. The yttrium, silver, and manganese in washcoat 104 may be present in about 1% to about 10%, by weight, separately. The loading of yttrium, silver, and manganese in washcoat 104 may be present in about 1.2 g/L to about 12 g/L, separately.

Applications of ZPGM DOC Catalyst Systems

Applications that may be presented for ZPGM DOC catalyst systems of present disclosure may include oxidation of NO to $NO_2$, low temperature $NO_x$ storage, and diesel oxidation. Performance and catalyst activity of fresh and aged coated samples prepared in Example #1 and Example #2 may be obtained for said applications.

NOx Storage and Oxidation of NO to $NO_2$

Figure 2:
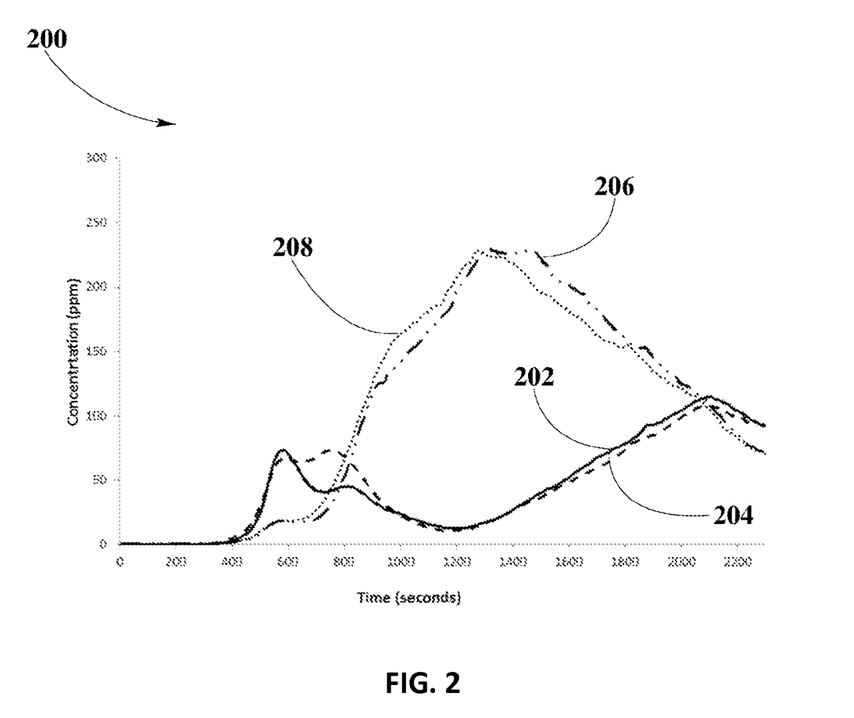
FIG. 2 shows NO oxidation comparison of fresh and aged coated samples of Example #1 perovskite, according to an embodiment.

FIG. 2 shows NO oxidation comparison 200 of fresh and aged coated samples of Example #1. The feed stream may include 150 ppm of NO and 14% of oxygen. Aging may be performed under hydrothermal condition at 750° C. for 5 hours with 10% steam present. FIG. 2 compares the concentration of NO graph 202 and NO2 graph 206 in fresh coated sample of Example #1 at outlet stream by reaction time. FIG. 2 also compares the concentration of NO graph 204 and NO2 graph 208 in aged coated sample of Example #1 at outlet stream by reaction time. For fresh samples, NO concentration at outlet is zero by the time less than 400 seconds which is equal to temperature 120° C. Since the NO concentration in feed is 150 ppm, this results shows the adsorption (storing) of NO may take place at a temperature less than 120° C. by this catalyst. Above temperature of 120° C., desorption of NO may be observed, which may be caused by a saturation of the catalyst by NO. The concentration of $NO_2$ may start to appear from temperature 120° C. and increase by temperature of 300° C. (at time approximately 1360 seconds). This result shows oxidation of NO to NO2 starting at a low temperature as 120° C. Aged samples also show NO storage and formation of $NO_2$ and may be as active in as fresh coated samples.

Figure 3:
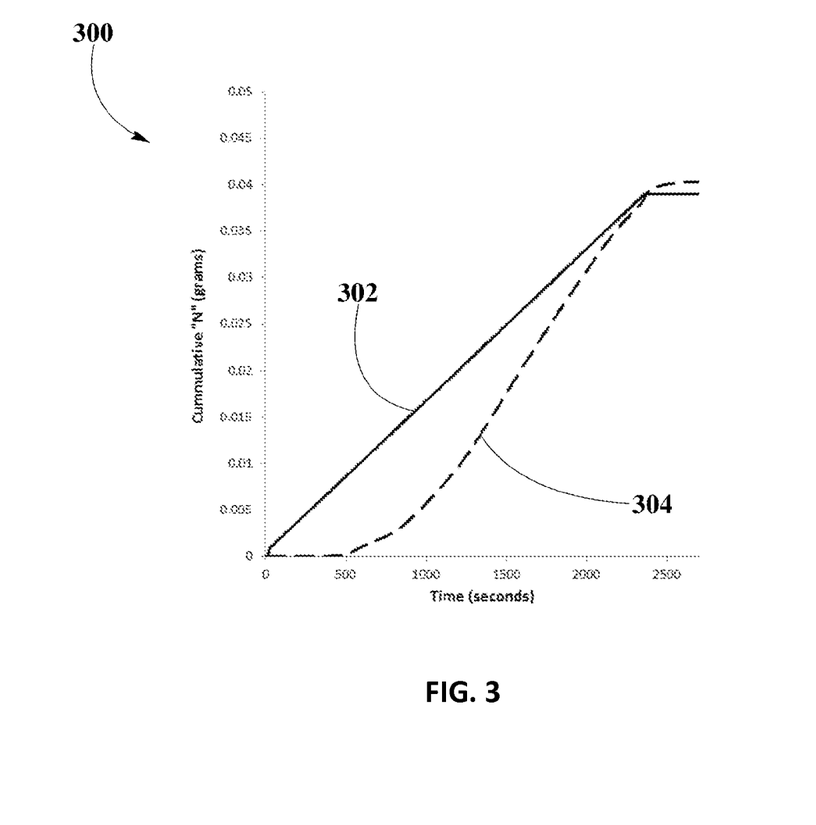
FIG. 3 presents nitrogen mass balance delivered as NO, according to an embodiment.

FIG. 3 presents Nitrogen mass balance comparison 300 delivered as NO for fresh coated sample of Example #1. The feed stream may include 150 ppm of NO and 14% of oxygen. Graph 302 shows the cumulative gram nitrogen atom (N) of the inlet over time of reaction and graph 304 shows the cumulative gram nitrogen atom (N) of outlet over time of reaction. As may be seen in FIG. 3, the total cumulative grams of outlet N atom is less than the total cumulative grams of inlet N atom which may indicate that storage of N atom may take place in this samples. The same result observed for aged sample. Aging may be performed under hydrothermal condition at 750° C. for 5 hours with 10% steam present.

Figure 4:
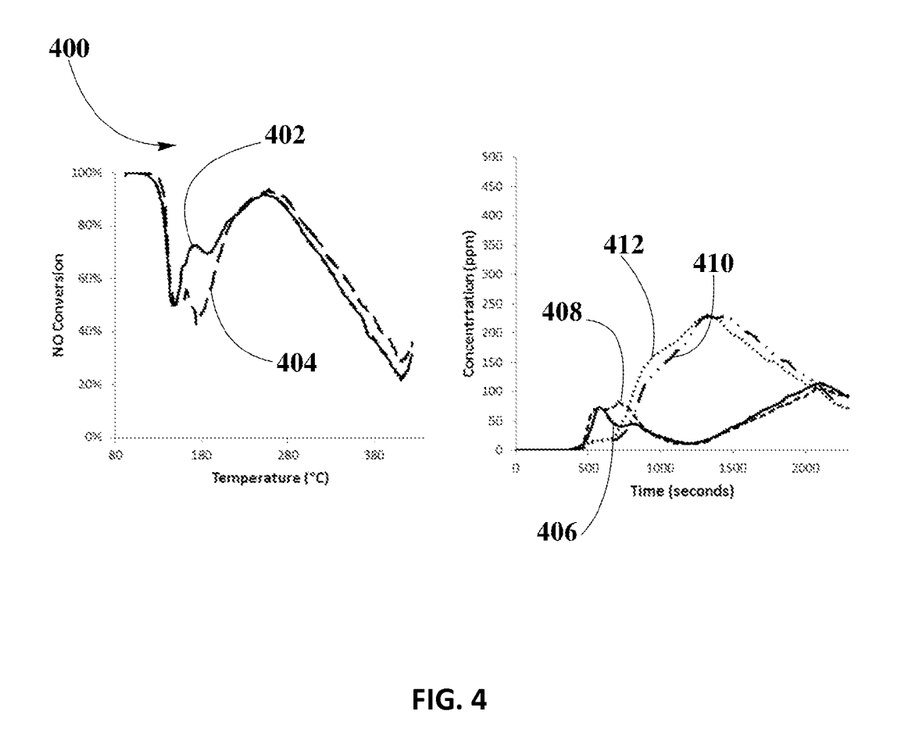
FIG. 4 depicts NO oxidation comparison by type of catalyst preparation methods, according to an embodiment.

FIG. 4 depicts NO oxidation comparison 400 by type of catalyst preparation methods, according to an embodiment. Performance of fresh coated samples of Example #1 may be compared with performance of fresh coated samples of Example #2. FIG. 4A shows NO conversion 402 of fresh coated samples of Example #1 and NO conversion 404 of fresh coated samples of Example #2. The feed stream may include 150 ppm of NO and 14% of oxygen. A NO conversion of 100% at the temperature below 120° C., corresponds to fully adsorption of NO by both samples at lower temperatures. FIG. 4B shows the concentration of NO and $NO_2$ at outlet stream during NO oxidation activity for both type of fresh coated samples. Graph 406 shows NO concentration and graph 410 shows $NO_2$ formation for fresh coated sample of Example #1. Graph 408 shows NO concentration and graph 412 shows $NO_2$ formation for fresh coated sample of Example #2. As may be seen, sample of Example #1 prepared by impregnation of Y—Ag—Mn perovskite shows approximately similar NO conversion, low temperature NO storage, and $NO_2$ production as sample of Example #2 prepared by co-precipitation method. The same result observed for aged sample. Aging may be performed under hydrothermal condition at 750° C. for 5 hours with 10% steam present.

Diesel Oxidation

Figure 5:
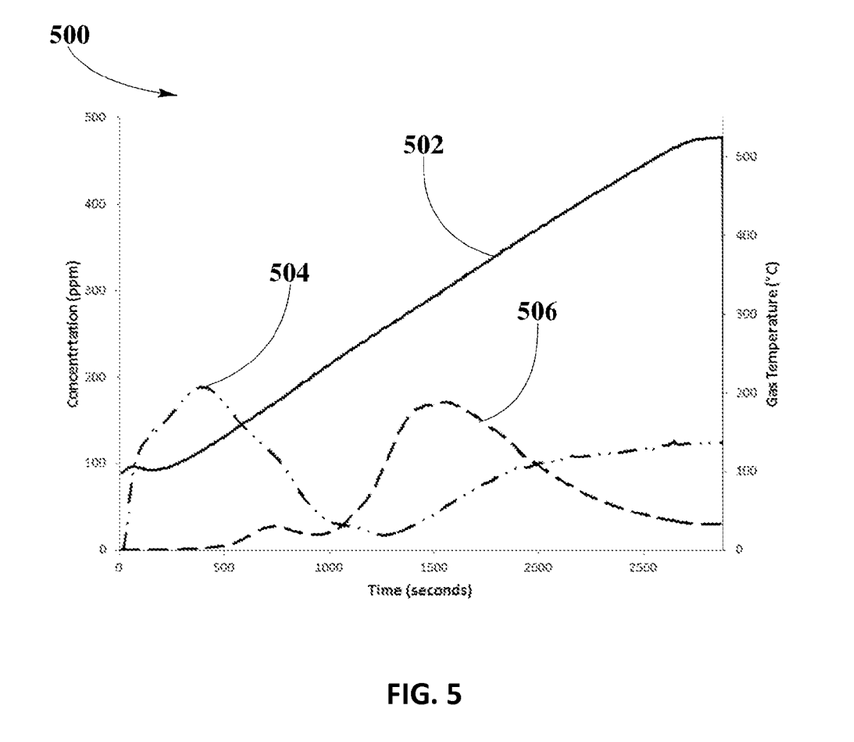
FIG. 5 depicts diesel oxidation catalyst performance of fresh coated samples, according to an embodiment.

FIG. 5 depicts diesel oxidation catalyst performance 500 of fresh coated samples of Example #1. The light-off test may be performed under simulated DOC exhaust condition. The feed gas stream may include 150 ppm NO, 1500 ppm of CO, 430 ppm of $C_3H_6$ as feed hydrocarbon, 4% $CO_2$, 4% of $H_2O$ and 14% of oxygen. The test may be performed by increasing the gas temperature from about 100° C. to about 550° C. at a temperature ramp shown in temperature profile 502.

The light-off test results illustrate as NO concentration profile 504 and NO2 production profile 506. In NO concentration profile 504 is noticed that NO storage may take place at beginning of test, showing zero concentration in outlet stream. Then, catalyst is saturated by NO and starts to desorb NO over a reaction time up to approximately 400 seconds when gas temperature is equal to 127° C. At this temperature, oxidation of NO to $NO_2$ may start as shown by increasing the concentration of $NO_2$ in NO2 production profile 506. During DOC light-off test neither $N_2O$ nor $NH_3$ may form.

Figure 6:
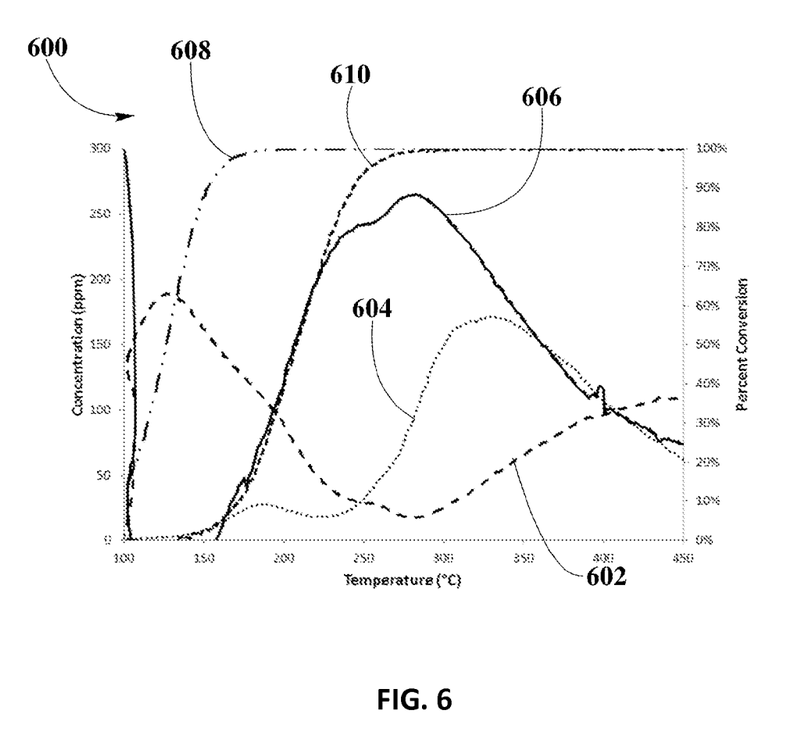
FIG. 6 reveals catalyst activity, DOC light off testing, according to an embodiment.

FIG. 6 DOC light off test 600 results of fresh coated samples of Example #1. The light-off test may be performed under simulated DOC exhaust condition. The feed gas stream may include 150 ppm NO, 1500 Ppm of CO, 430 ppm of $C_3H_6$ as hydrocarbon, 4% $CO_2$, 4% of $H_2O$ and 14% of oxygen. The test may be performed by increasing the gas temperature from about 100° C. to about 450° C.

DOC light off test 600 include performance results for NO conversion, CO conversion, and HC conversion which may be seen in FIG. 6 as % NO conversion 606, % CO conversion 608 and % HC conversion 610. FIG. 6 also contains NO concentration profile 602 and NO2 concentration profile 604. % NO conversion 606 shows a full conversion of NO at the beginning which correspond to fully adsorption of NO by catalyst at very low temperature. This confirms by a zero concentration of outlet stream NO at the beginning of the reaction on NO concentration profile 602. NO conversion starts to increase from temperature of about 150° C. as shown in % NO conversion 606 which coincides with increasing the concentration of $NO_2$ in NO2 concentration profile 604. % NO conversion 606 shows a T50 of NO at 207° C. Additionally, no $NH_3$ or $N_2O$ formation is noticed.

All NO conversion may be only related to $NO_2$ formation, which may result from the oxidation of NO to $NO_2$.

As may be seen in % CO conversion 608 and % HC conversion 610, the catalyst has a T50 for CO and HC at temperature of 126° C. and 207° C., respectively. However, no hydrocarbon storage may occur on this catalyst during this reaction.

Figure 7:
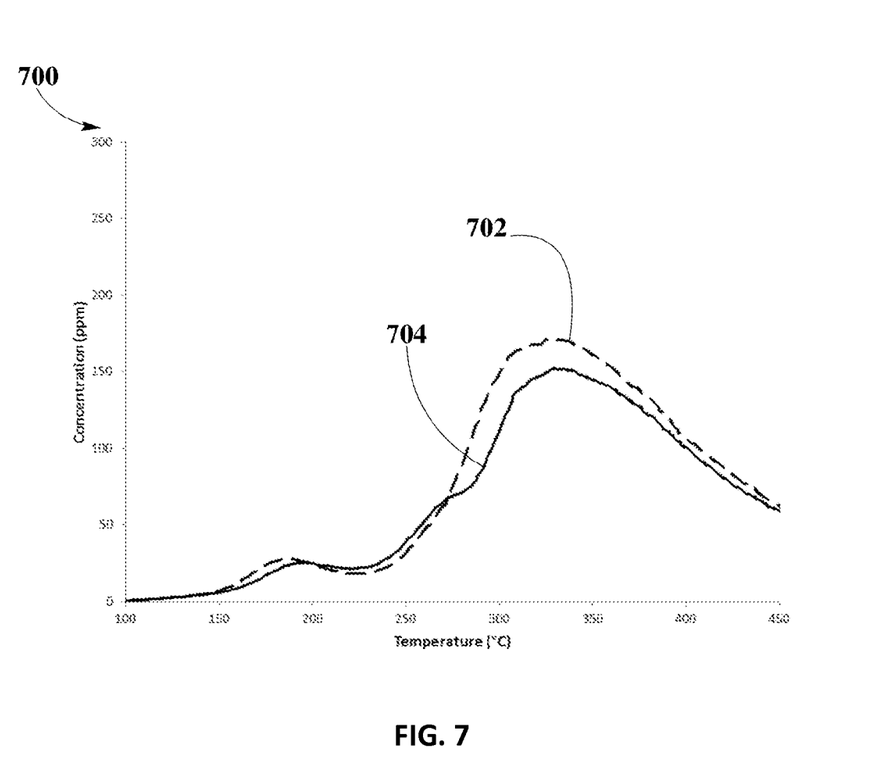
FIG. 7 presents comparison of $NO_2$ production in fresh and aged coated samples, according to an embodiment.

FIG. 7 presents NO2 production comparison 700 in fresh and aged coated samples of Example #1. Aging of samples may be performed under hydrothermal condition at 750° C. for 5 hours with 10% steam present. The light-off test may be performed under simulated DOC exhaust condition. Feed gas stream includes of 150 ppm NO, 1500 ppm of CO, 430 ppm of $C_3H_6$ as hydrocarbon, 4% $CO_2$, 4% of $H_2O$ and 14% of oxygen. The test may be performed by increasing the gas temperature from about 100° C. to about 450° C. As may be seen from the comparison of fresh coated sample NO2 concentration 702 and aged coated sample NO2 concentration 704, a slight decrease in $NO_2$ production may take place after aging. However, oxidation of NO to $NO_2$ which is consistent with $NO_2$ production may occur at the same condition for both samples.

Figure 8:
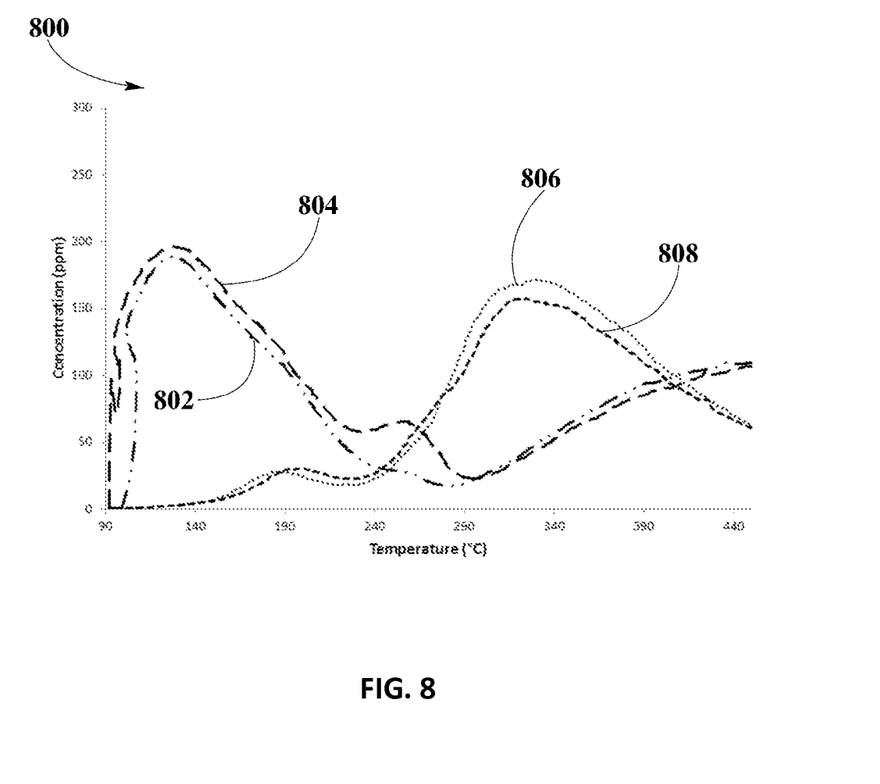
FIG. 8 illustrates NO and $NO_2$ concentration by type of catalyst preparation, according to an embodiment.

FIG. 8 depicts DOC test result comparison 800 by type of catalyst preparation methods, according to an embodiment. Performance of fresh coated samples of Example #1 may be compared with performance of fresh coated samples of Example #2.

NO concentration profile 802 and NO concentration profile 804 show outlet stream NO concentrations for fresh coated samples prepared by impregnation in Example #1 and co-precipitation in Example #2, respectively. NO2 concentration profile 806 and NO2 concentration profile 808 show concentration of $NO_2$ production for fresh coated samples prepared by impregnation in Example #1 and co-precipitation in Example #2, respectively. As may be seen, $NO_2$ production in sample of Example #1 prepared by impregnation is greater than $NO_2$ production in sample of Example #2 prepared by co-precipitation method.

The different applications of ZPGM DOC catalyst systems 100 may reveal that NO conversion observed during catalyst performance testing may be from oxidation of NO to $NO_2$. A large storage of NO may take place at temperatures lower than 120° C., followed by releasing of NO. At this point, the catalyst activity may continue with a re-initiated NO conversion to $NO_2$ from 120° C. Additionally, it may be also observed that neither $N_2O$ nor $NH_3$ may form. The aged coated samples may be as active as fresh coated samples under NO oxidation and DOC exhaust condition. The Y—Ag—Mn perovskite catalysts prepared by one step washcoat method (co-precipitation) may be as active as Y—Ag—Mn perovskite catalysts prepared by two step method (impregnation) and may be used as a replacement for NO oxidation.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A zero platinum group metal (ZPGM) catalyst system, comprising: a substrate; and
    a washcoat suitable for deposition on the substrate, comprising at least one oxide solid selected from the group consisting of at least one carrier material oxide, and at least one ZPGM catalyst; and
    an impregnation layer comprising $Y_{0.8}Ag_{0.2}MnO_3$;
    wherein at least one of the at least one ZPGM catalyst comprises at least one perovskite structured compound having the formula $ABO_3$, wherein each of A and B is selected from the group consisting of at least one of yttrium, silver, manganese, lanthanum, cerium, iron, praseodymium, neodymium, strontium, cadmium, cobalt, scandium, copper, niobium, tungsten, and combinations thereof;

wherein substantially all NO is oxidized to $NO_2$.

2. The ZPGM catalyst system of claim 1, wherein the at least one perovskite structured compound has a general cation formula of $A_{1-x}a_xB_{1-y}b_yO_3$, wherein x is from 0 to 1.

3. The ZPGM catalyst system of claim 1, wherein the at least one carrier material oxide is selected from the group consisting of $ZrO_2$, doped $ZrO_2$ with lanthanide group metals, $Nb_2O_5$, $Nb_2O_5$—$ZrO_2$, alumina, doped alumina, $TiO_2$, doped $TiO_2$ and mixtures thereof.

4. The ZPGM catalyst system of claim 1, wherein the at least one perovskite structured compound is of the general formula $Y_{1-x}Ag_xMnO_3$, wherein x is from 0 to 1.

5. The ZPGM catalyst system of claim 4, wherein the at least one perovskite structured compound is applied to the washcoat by a method selected from the group consisting of impregnated and co-precipitation.

6. The ZPGM catalyst system of claim 5, wherein the at least one carrier material oxide comprises praseodymium doped zirconia.

7. The ZPGM catalyst system of claim 1, wherein substantial adsorption of NO occurs below about 120° C.

8. An apparatus for reducing emissions from an engine having associated therewith an exhaust system, comprising:
   an exhaust source;
   a substrate; and
   a washcoat suitable for deposition on the substrate, comprising at least one oxide solid further comprising at least one carrier metal oxide and at least one ZPGM catalyst; and
   an impregnation layer comprising a perovskite structured compound is of the general formula $Y_{1-x}Ag_xMnO_3$ wherein x is from 0 to 1, wherein at least one of the at least one ZPGM catalyst comprises at least one perovskite structured compound having the formula $ABO_3$, wherein each of A and B is selected from the group consisting of at least one of yttrium, silver, manganese, lanthanum, cerium, iron, praseodymium, neodymium, strontium, cadmium, cobalt, scandium, copper, niobium, tungsten, and combinations thereof;

wherein substantially all NO is oxidized to $NO_2$.

9. The apparatus of claim 8, wherein the exhaust source comprises an NO concentration of 150 ppm wherein substantial adsorption of NO occurs below about 120° C.

10. The apparatus of claim 8, wherein the at least one perovskite structured compounds has a general cation formula of $A_{1-x}a_xB_{1-y}b_yO_3$, wherein x is from 0 to 1.

11. The apparatus of claim 8, wherein the at least one carrier material metal oxide is selected from the group consisting of $ZrO_2$, doped $ZrO_2$ with lanthanide group metals, $Nb_2O_5$, $Nb_2O_5$—$ZrO_2$, alumina, doped alumina, TiO2, doped $TiO_2$ and mixtures thereof.

12. The apparatus of claim 8, wherein the at least one perovskite structured compound is of the general formula $Y_{1-x}Ag_xMnO_3$, wherein x is from 0 to 1.

13. The apparatus of claim 12, wherein the at least one perovskite structured compound is applied to the washcoat by a method selected from the group consisting of impregnated impregnation and co-precipitation.

14. The apparatus of claim 13, wherein the at least one carrier material metal oxide comprises praseodymium doped zirconia.

* * * * *

UNITED STATES PATENT AND TRADEMARK OFFICE
CERTIFICATE OF CORRECTION

PATENT NO.         : 9,498,767 B2
APPLICATION NO.    : 13/904271
DATED              : November 22, 2016
INVENTOR(S)        : Nazarpoor It is certified that error appears in the above-identified patent and that said Letters Patent is hereby corrected as shown below:

In the Claims

Column 10,
Line 16, "structured compounds" should read --structured compound--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*